US010085090B2

(12) United States Patent
Christoph et al.

(10) Patent No.: US 10,085,090 B2
(45) Date of Patent: Sep. 25, 2018

(54) LOUDSPEAKER ARRANGEMENT IN A CAR INTERIOR

(71) Applicant: HARMAN BECKER AUTOMOTIVE SYSTEMS GMBH, Karlsbad (DE)

(72) Inventors: Markus Christoph, Straubing (DE); Matthias Kronlachner, Regensburg (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 4 days.

(21) Appl. No.: 15/389,566

(22) Filed: Dec. 23, 2016

(65) Prior Publication Data

US 2017/0188153 A1 Jun. 29, 2017

(30) Foreign Application Priority Data

Dec. 23, 2015 (EP) .................................... 15202359

(51) Int. Cl.

| | |
|---|---|
| ***H04R 5/02*** | (2006.01) |
| ***H04R 1/40*** | (2006.01) |
| *H04R 3/12* | (2006.01) |

(52) U.S. Cl.

CPC ............... *H04R 5/02* (2013.01); *H04R 1/403* (2013.01); *H04R 3/12* (2013.01); *H04R 5/023* (2013.01); *H04R 2201/40* (2013.01); *H04R 2201/401* (2013.01); *H04R 2499/13* (2013.01)

(58) Field of Classification Search

CPC ...... H04R 5/02; H04R 1/403; H04R 2499/13; H04R 3/12; H04R 2201/401; H04R 2201/40; H04R 5/023

USPC ... 381/302, 300, 389, 386, 86, 387, 150, 59, 381/58, 56, 336

See application file for complete search history.

(56) References Cited

U.S. PATENT DOCUMENTS

2008/0273724 A1* 11/2008 Hartung .................. H04S 7/302 381/302

FOREIGN PATENT DOCUMENTS

| | | | |
|---|---|---|---|
| WO | 2005117483 | A1 | 12/2005 |
| WO | 2006091540 | A2 | 8/2006 |
| WO | 2009012500 | A2 | 1/2009 |

OTHER PUBLICATIONS

Zotter, "Analysis and Synthesis of Sound-Radiation With Spherical Arrays", Institute of Electronic Music and Acoustics, University of Music and Performing Arts, Austria, Sep. 2009, 192 pages.

Extended European Search Report for Application No. 15202359.4, dated Jun. 10, 2016, 8 pages.

* cited by examiner

*Primary Examiner* — Vivian Chin
*Assistant Examiner* — Con P Tran
(74) *Attorney, Agent, or Firm* — Brooks Kushman P.C.

(57) ABSTRACT

Disclosed is a loudspeaker array with a multiplicity of array loudspeakers. The multiplicity of array loudspeakers is mounted in a surface of a rigid hemisphere that encloses an acoustic volume. The array loudspeakers are regularly or quasi-regularly distributed over the surface of the rigid hemisphere, and a loudspeaker arrangement includes such an array.

9 Claims, 5 Drawing Sheets

LOUDSPEAKER ARRANGEMENT IN A CAR INTERIOR

CROSS-REFERENCE TO RELATED APPLICATIONS

This application claims priority to EP application Serial No. 15202359.4 filed Dec. 23, 2015, the disclosure of which is hereby incorporated in its entirety by reference herein.

TECHNICAL FIELD

The disclosure relates to a loudspeaker arrangement in a car interior, and a loudspeaker array applicable in the loudspeaker arrangement.

BACKGROUND

Common loudspeaker arrangements in the interiors of car and other vehicles, include a multiplicity of loudspeakers distributed throughout the interior. For example, broadband loudspeakers, midrange loudspeakers and tweeters may be disposed, for example, in the dashboard, in the doors, on the pillars, the rear shelf, etc. to provide various audio sources at various positions within the car interior. However such arrangements are not sufficient to bring convincing three-dimensional (3D) audio into a car environment. Even two-dimensional (2D) audio is not easy to realize with a common loudspeaker arrangement. It is a desire to provide improved 2D and 3D audio in a car.

SUMMARY

An example of a loudspeaker arrangement in a car—includes a loudspeaker array with a multiplicity of array loudspeakers. The multiplicity of array loudspeakers is mounted in a surface of a rigid hemisphere that encloses an acoustic volume. The array loudspeakers are regularly or quasi-regularly distributed over the surface of the hemisphere.

An example of a loudspeaker array includes a multiplicity of array loudspeakers. The array loudspeakers are mounted in a surface of a rigid hemisphere that encloses an acoustic volume. The array loudspeakers are regularly or quasi-regularly distributed over the surface of the hemisphere.

Other arrangements, arrays, features and advantages will be, or will become, apparent to one with skill in the art upon examination of the following Figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION

With a common loudspeaker arrangement that includes a multiplicity of loudspeakers (also referred to as speakers) distributed throughout the car interior one is able, by utilizing advanced digital signal processing techniques, to create a pleasant 2D acoustic field along the horizontal plane (middle layer), even if most of the loudspeakers are installed at a lower layer. However, applying 2D acoustic rendering in the horizontal plane with this loudspeaker setup yields to directional gaps if rendering is done for the full 360° circle. Especially the lateral positions are not well covered and it is not possible to create a convincing virtual source for all passengers from the side.

Additionally, it proves difficult to create a virtual source from the front for the rear passengers. Installing loudspeakers at the back of the front seats would solve this problem. However, due to the fact that the front seats are not fixed and will be adjusted by the front passengers, they are not well suited for loudspeaker positions. Therefore, these positions cannot be used if one wants to guarantee stable playback conditions. Since there are not many possibilities in a car for installing additional loudspeakers, the previously described problem is not easy to solve. The term “car” is understood to mean and include any type of vehicle having an interior.

Figure 1:
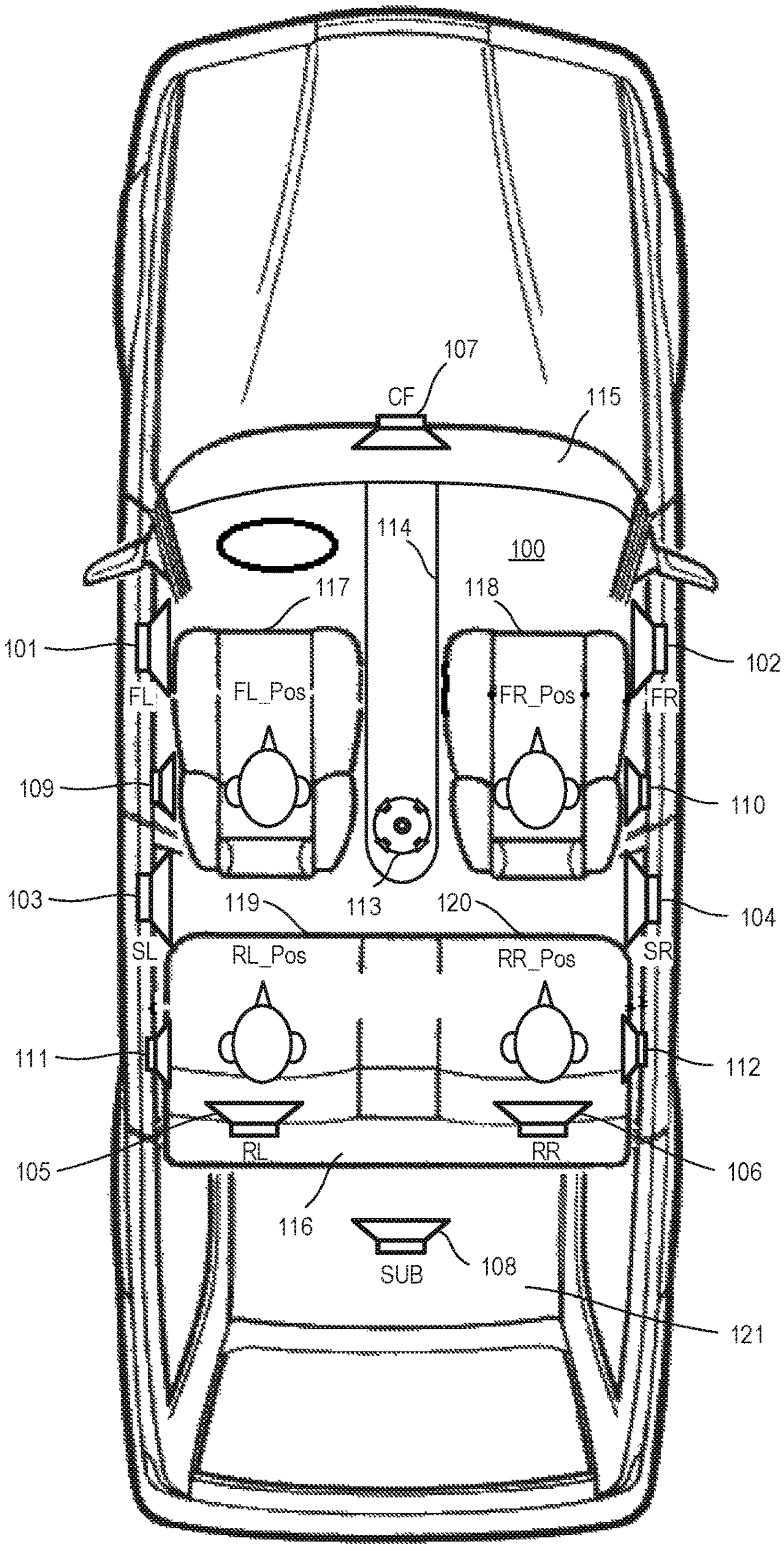
FIG. 1 is a schematic diagram illustrating an exemplary loudspeaker setup with additional loudspeakers disposed on the side or the center of the car interior.

FIG. 1 shows an exemplary loudspeaker setup based on a common loudspeaker setup but with additional loudspeakers installed at a low or medium levels. In this regard, when dividing the distance between the floor and the ceiling of a car interior 100 into three equal sections (i.e., each with a height of ⅓ of the distance between the floor and the ceiling), lower levels are within the section close to the floor, the higher levels fall within the section close to the ceiling and the middle levels fall into the section between the two. In the setup shown in FIG. 1, woofers, broadband loudspeakers or midrange loudspeakers 101 to 104, as are appropriate in combination with tweeters (not shown), may be disposed in a conventional way, for example, in doors of a car, in a front left (FL), front right (FR), side left (SL) and side right (SR) position. Conventionally, further woofers, broadband or midrange loudspeakers 105 to 107, as are appropriate in combination with tweeters (not shown), may be disposed in or on the rear shelf 116 in a rear left (RL) and rear right position (RR), and in or on the dashboard 115 in a front central (CF) position. Also conventionally, a subwoofer 108 may be disposed somewhere in or close to the car interior 100, for example, in the trunk 121, in a position SUB.

In addition to the common loudspeaker setup, loudspeakers 109 to 112 are disposed at low and/or medium levels to fill the directional gaps at the lateral positions for all seats, as well as at the frontal positions for both rear seats. The loudspeakers 109 to 112 may be broadband or midrange loudspeakers, as are appropriate in combination with tweeters (not shown), and may be disposed between the loudspeaker positions FL and SL, FR and SR, SL and RL, and SR and RR.

Furthermore, a loudspeaker array 113 with a multiplicity of array loudspeakers may be disposed in the vicinity of the center of the car interior 100, for example, in or on (a rear or center portion of) a center console 114 in the car interior 100. At least some of the array loudspeakers have a main direction that points to corresponding seating positions 117 to 120 within the car interior 100. The enhanced loudspeaker setup shown in FIG. 1 allows for improving the 2D audio performance, for example, the acoustic field in the horizontal plane, which can be important for immersive acoustics.

Figure 2:
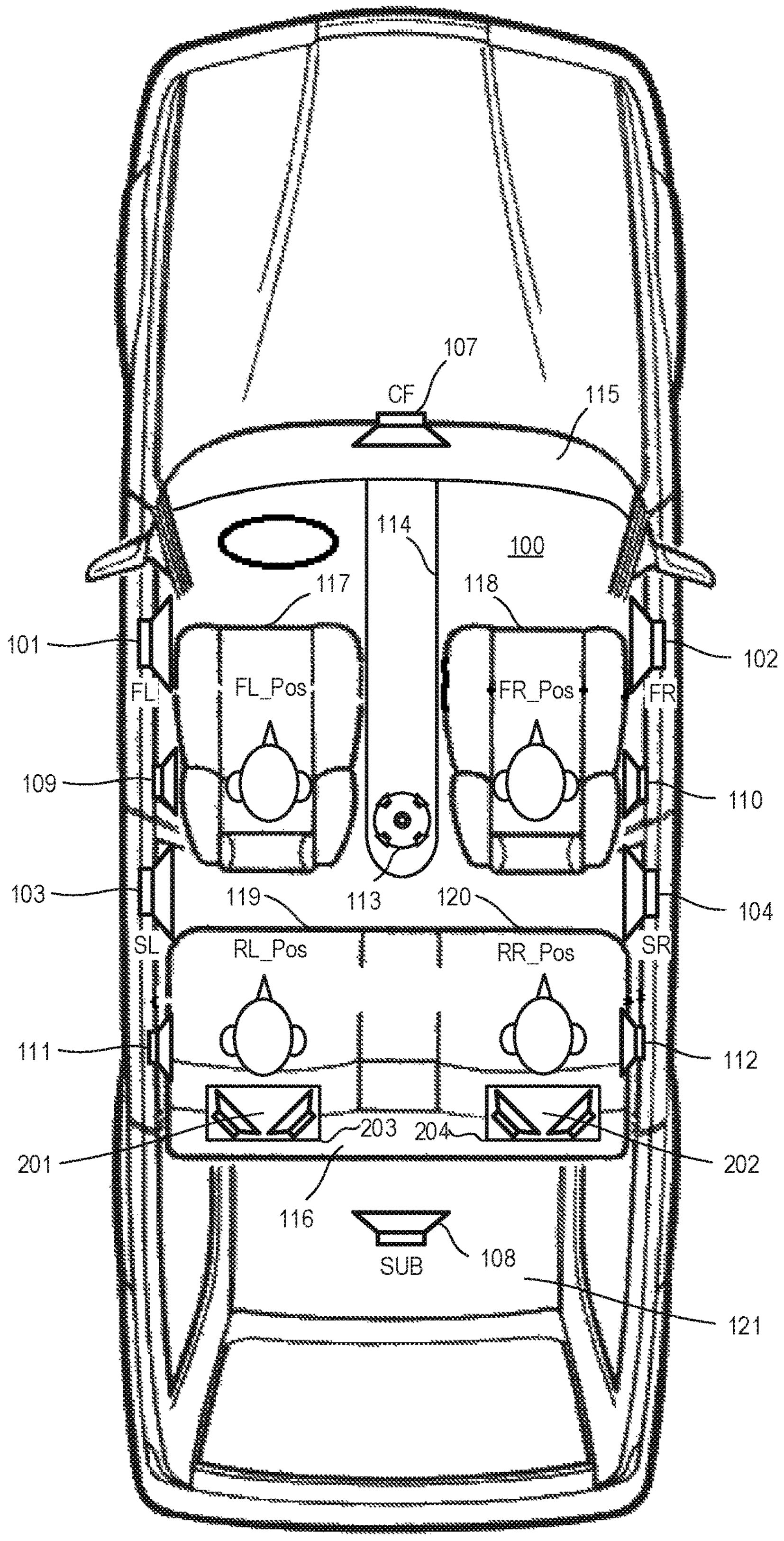
FIG. 2 is a schematic diagram illustrating an exemplary loudspeaker setup with additional loudspeakers disposed in the headrest of the rear seats.

To improve the rendering of virtual sources from the rear direction, alternatively (shown) or additionally (not shown) to the loudspeakers 105 and 106 in positions RL and RR in or on the rear shelf 116, pairs of headrest loudspeakers 201 and 202 disposed in the headrests 203 and 204 of the rear seats 119 and 120 may be utilized as depicted in FIG. 2. The pairs of headrest loudspeakers 201 and 202 can improve rear localization for all passengers. For this, small loudspeakers (for example, mid-range or broadband loudspeakers such as loudspeakers 109 to 112) may be installed in all four doors of the car at positions lateral to the passengers.

The additional headrest loudspeakers 201 and 202 may be used to improve rendering from the back. Furthermore, in the loudspeaker array 113, which here establishes a higher order loudspeaker (HOL), the loudspeakers may be distributed over a dome-like body in a regular or quasi-regular fashion and may be installed at the center or end of the center console 114. HOL are loudspeakers or loudspeaker arrays that are capable of producing polar responses up to the $N^{th}$ order, i.e., polar responses up to $\cos(N\phi)$ and $\sin(N\phi)$, wherein N is an integer greater zero (for example, N=1, 2, 3, 4 etc.), and $\phi$ is the polar angle. Regular distribution is defined as loudspeakers that are arranged or ordered according to some established rule, law, principle, or type. The headrest loudspeakers for the rear passengers as well as optional headrest loudspeakers for the front passengers can contribute to individually improving surround sound reproduction for certain passenger positions.

Figure 3:
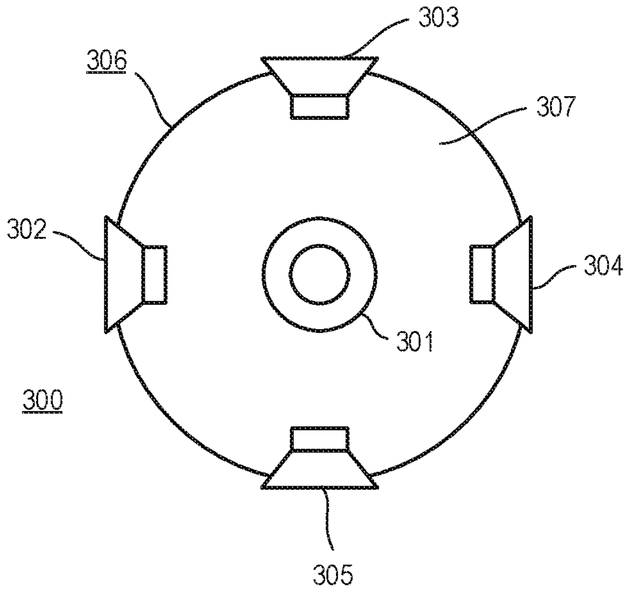
FIG. 3 is a top view of a loudspeaker array utilized in the setup shown in FIGS. 1 and 2.
Figure 4:
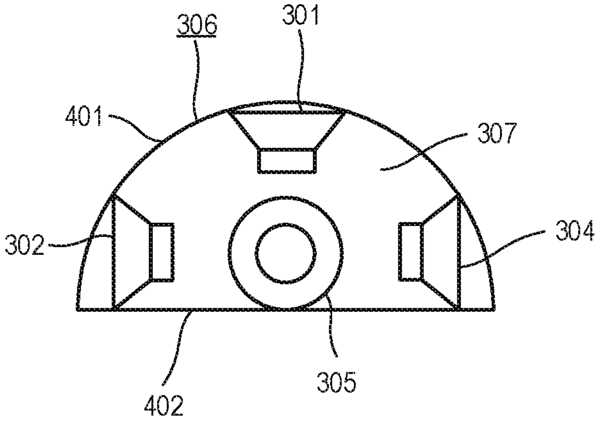
FIG. 4 is a side view of the loudspeaker array shown in FIG. 3.

As detailed in FIGS. 3 (top view) and 4 (side view), an exemplary loudspeaker array 300 may include five array loudspeakers 301 to 305 mounted in or on the surface of a rigid hemisphere 306 that encloses an acoustic volume 307, and are regularly or quasi-regularly distributed over the surface of the hemisphere 306. The hemisphere 306 has a dome-shaped surface 401 and another part has a plane surface 402. The array loudspeakers 301 to 305 are mounted in or on the dome-shaped surface 401. Loudspeakers 302 to 305 may be arranged close to the plane surface 402 and loudspeaker 301 may be arranged most distant to the plane surface 402, for example, at a pole of the hemisphere 306. Each of the four array loudspeakers 302 to 305 arranged close to the plane surface 402 has a main direction that points to a corresponding seat 117 to 120 within the car interior 100 shown in FIGS. 1 and 2. With such an array, virtual directional sources with arbitrary directivity can be created utilizing beamforming. This helps to close the remaining directional gaps.

Figure 5:
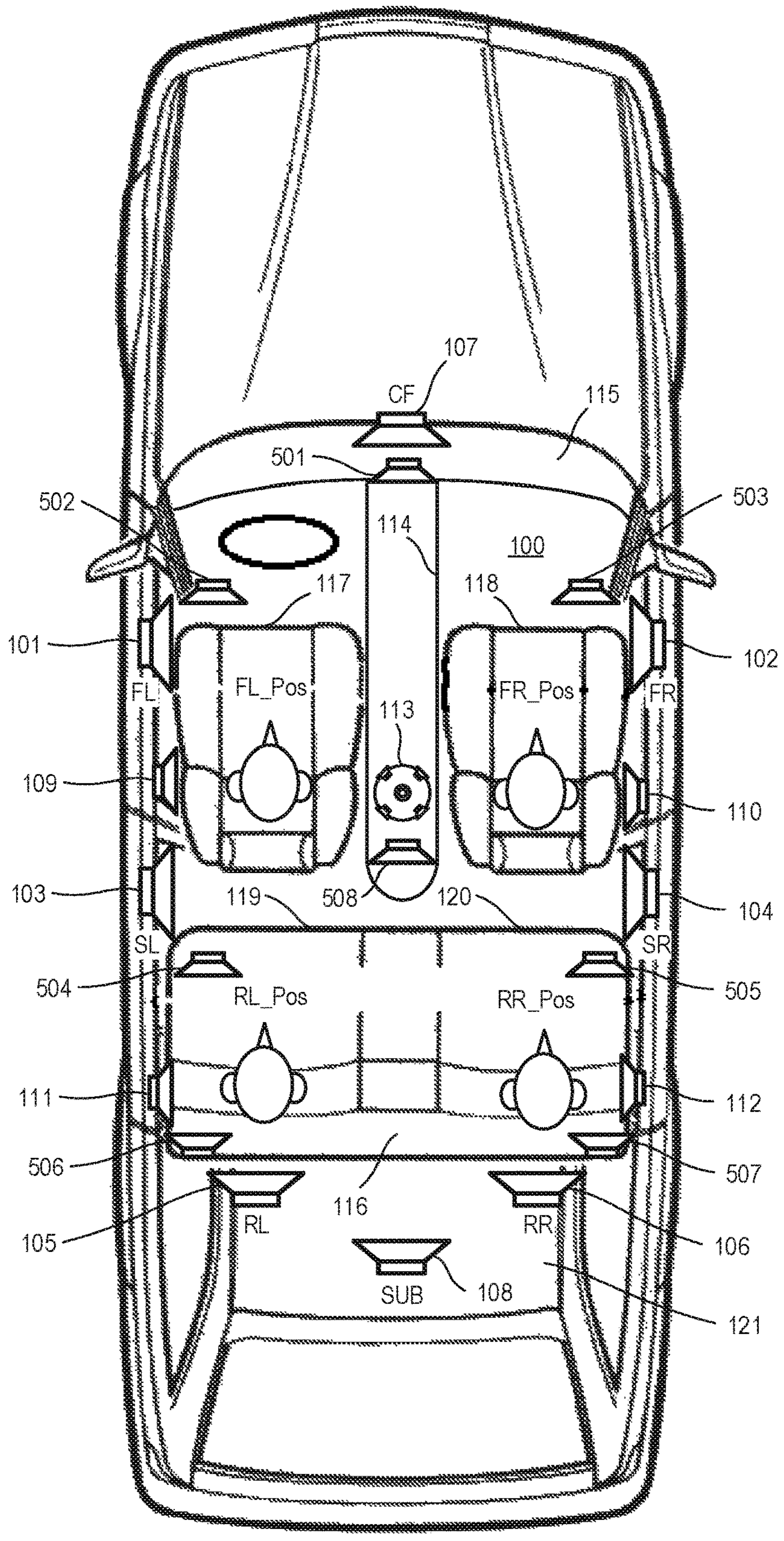
FIG. 5 is a schematic diagram illustrating an exemplary loudspeaker setup with additional loudspeakers disposed in ceiling of the car interior.

In order to create a true 3D acoustical field, further loudspeakers may be disposed in an elevated level, for example, in the headliner of the car interior 100 as shown in FIG. 5. A loudspeaker 501 may be positioned in the vicinity of the interior rearview mirror in the front portion of the ceiling. Loudspeakers 502 to 505 may be mounted into the ceiling above or in front of the passenger seats 117 to 120 or the respective passenger's heads. Loudspeakers 506 and 507 may be disposed behind the front seats 117 and 118. Furthermore, a loudspeaker 508 may be mounted into a central portion of the ceiling. Loudspeakers 501 to 508 may be broadband loudspeakers or midrange loudspeakers.

Figure 6:
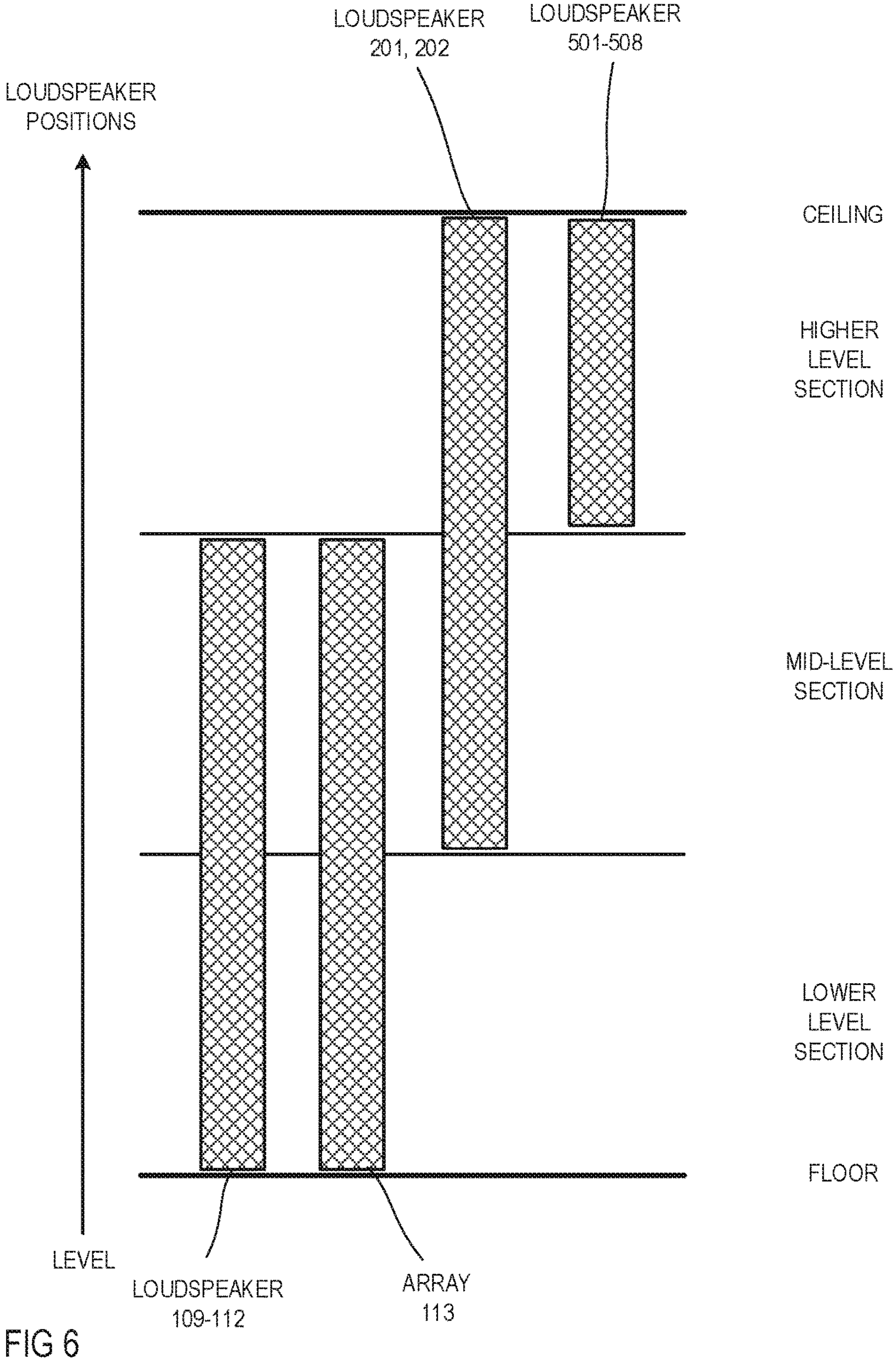
FIG. 6 is a schematic diagram illustrating different levels of the additional loudspeakers.

As can roughly be seen in FIG. 6, loudspeakers 109 to 112 may be disposed at lower or medium levels, loudspeakers 201 and 202 at medium or higher levels, and loudspeakers 501 to 508 at higher levels. An array 113 may be disposed at lower or medium levels.

The description of embodiments has been presented for purposes of illustration and description. Suitable modifications and variations to the embodiments may be performed in light of the above description. The described arrangements and arrays are exemplary in nature, and may include additional elements and/or omit elements. As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects.

What is claimed is:

1. A loudspeaker arrangement in a car interior, the arrangement comprising a loudspeaker array with a multiplicity of array loudspeakers, wherein the multiplicity of array loudspeakers is mounted in a surface of a rigid hemisphere that encloses an acoustic volume, and the array loudspeakers are regularly or quasi-regularly distributed over the surface of the rigid hemisphere, wherein at least some of the multiplicity of array loudspeakers are broadband loudspeakers, wherein a distance between a floor and a ceiling of the car interior comprises three equal sections, in which a first section close to the floor comprises lower level positions, a second section close to the ceiling comprises higher level positions and a third section between the first and second sections comprises middle level positions, wherein the loudspeaker arrangement further comprises a multiplicity of first additional loudspeakers, wherein the first additional loudspeakers are broadband loudspeakers;

wherein the first additional loudspeakers are disposed at the lower level positions and in at least one of a front portion of the car interior, a rear portion of the car interior or a side portion of the car interior;

wherein the loudspeaker arrangement further comprises a multiplicity of second additional loudspeakers;

wherein the second additional loudspeakers are broadband loudspeakers;

wherein the second additional loudspeakers are disposed in the middle or higher level positions and in at least one of the side portion of the car interior, the ceiling of the car interior and headrests of seats in the car interior;

wherein the loudspeaker arrangement further comprises a multiplicity of third additional loudspeakers;

wherein the third additional loudspeakers are broadband loudspeakers;

the third additional loudspeakers are disposed in at least one of the ceiling and a headliner of the car interior;

wherein the loudspeaker arrangement is configured to provide an audio output to improve two dimensional or three-dimensional audio in the car interior; and wherein the multiplicity of array loudspeakers utilizes beamforming to provide virtual directional sources with arbitrary directivity.

2. The loudspeaker arrangement of claim 1, wherein one part of the rigid hemisphere has a dome-shaped surface and another part has a plane surface, and the multiplicity of array loudspeakers is mounted in the dome-shaped surface.

3. The loudspeaker arrangement of claim 2, wherein the multiplicity of array loudspeakers comprise five array loudspeakers, four of which are arranged close to the plane surface and one is arranged most distant to the plane surface.

4. The loudspeaker arrangement of claim 3, wherein each of the four array loudspeakers close to the plane surface has a main direction that points to a corresponding seat within the car interior.

5. The loudspeaker arrangement of claim 1, wherein at least some of the first additional loudspeakers are disposed in or on the sides of the car interior in a vicinity of passenger seating positions.

6. The loudspeaker arrangement of claim 1, further comprising at least one fourth additional loudspeaker, wherein:

the at least one fourth additional loudspeaker is a woofer or subwoofer.

7. The loudspeaker arrangement of claim 1, wherein the loudspeaker array is disposed in or in a vicinity of a center of the car interior.

8. The loudspeaker arrangement of claim 1, wherein the loudspeaker array is disposed in or on a rear portion of a center console of the car interior.

9. A loudspeaker arrangement in a car interior, the arrangement comprising a loudspeaker array with a multiplicity of array loudspeakers, wherein the multiplicity of array loudspeakers is mounted in a surface of a rigid hemisphere that encloses an acoustic volume, and the array loudspeakers are regularly or quasi-regularly distributed over the surface of the rigid hemisphere, wherein:

a distance between a floor and a ceiling of the car interior comprises three equal sections, in which a first section is close to the floor, a second section close to the ceiling comprises higher level positions and a third section between the first and second sections comprises middle level positions;

the loudspeaker arrangement further comprises a multiplicity of first additional loudspeakers;

the first additional loudspeakers are broadband loudspeakers; and the first additional loudspeakers being disposed in the first section that is close to the floor and in at least one of a front portion of the car interior, a rear portion of the car interior, or a side portion of the car interior;

wherein the loudspeaker arrangement further comprises a multiplicity of second additional loudspeakers;

wherein the second additional loudspeakers are broadband loudspeakers;

wherein the second additional loudspeakers are disposed in the middle or higher level positions and in at least one of the side portion of the car interior, the ceiling of the car interior and headrests of seats in the car interior;

wherein the loudspeaker arrangement further comprises a multiplicity of third additional loudspeakers;

wherein the third additional loudspeakers are broadband loudspeakers; and the third additional loudspeakers are disposed in at least one of the ceiling and a headliner of the car interior;

wherein the loudspeaker arrangement is configured to provide audio outputs to improve two dimensional or three-dimensional audio in the car interior; and wherein the multiplicity of array loudspeakers utilizes beamforming to provide virtual directional sources with arbitrary directivity.

* * * * *